US012151492B2

(12) United States Patent
Klages et al.

(10) Patent No.: US 12,151,492 B2
(45) Date of Patent: Nov. 26, 2024

(54) LABEL PRINTER AND SYSTEM FOR MARKING A PROLATE OBJECT

(71) Applicant: Phoenix Contact GmbH & Co. KG, Blomberg (DE)

(72) Inventors: Kilian Klages, Detmold (DE); Alexander Hofmann, Hameln (DE); Michael Peter, Lage (DE); Albrecht Schierholz, Schieder-Schwalenberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 283 days.

(21) Appl. No.: 17/765,860

(22) PCT Filed: Oct. 6, 2020

(86) PCT No.: PCT/EP2020/077963
§ 371 (c)(1),
(2) Date: Sep. 20, 2022

(87) PCT Pub. No.: WO2021/069419
PCT Pub. Date: Apr. 15, 2021

(65) Prior Publication Data

US 2023/0001708 A1 Jan. 5, 2023

(30) Foreign Application Priority Data

Oct. 9, 2019 (BE) .................................. 2019/5661

(51) Int. Cl.
*B41J 3/407* (2006.01)
*B41J 11/00* (2006.01)
*B65C 3/02* (2006.01)

(52) U.S. Cl.
CPC ......... *B41J 3/4075* (2013.01); *B41J 11/0045* (2013.01); *B65C 3/02* (2013.01)

(58) Field of Classification Search
CPC ........ B41J 3/4075; B41J 11/0045; B41J 2/32; B41J 3/44; B41J 13/10; B41J 13/106;
(Continued)

(56) References Cited

U.S. PATENT DOCUMENTS

2003/0146943 A1 8/2003 Lehmkuhl et al.
2004/0211522 A1 10/2004 Fries et al.
2008/0073023 A1 3/2008 Fries et al.

FOREIGN PATENT DOCUMENTS

WO WO 2014098920 A1 6/2014

*Primary Examiner* — Lisa Solomon
(74) *Attorney, Agent, or Firm* — LEYDIG, VOIT & MAYER, LTD.

(57) ABSTRACT

A printer for outputting a printed product includes: a print head for printing on a print medium moving in a longitudinal direction, the print medium including a plurality of separate or separable labels detachably arranged on a carrier along the longitudinal direction; and a material interface for outputting the print medium printed by the printer as a printed product, the material interface including a dispensing edge and a support, which deflect the carrier over the dispensing edge and the support downstream of the print head in the longitudinal direction. The dispensing edge is arranged relative to the support in a first position to induce a detaching deflection of the carrier for detaching the respective label. The dispensing edge and the support are arranged in a second position relative to each other to induce an entraining deflection for entraining the respective label on the carrier.

21 Claims, 11 Drawing Sheets

(58) Field of Classification Search
CPC .. B41J 29/393; B65C 3/02; B65C 2009/0003; B65C 2009/0093; H01B 13/344; H01R 13/465
See application file for complete search history.

LABEL PRINTER AND SYSTEM FOR MARKING A PROLATE OBJECT

CROSS-REFERENCE TO PRIOR APPLICATIONS

This application is a U.S. National Phase application under 35 U.S.C. § 371 of International Application No. PCT/EP2020/077963, filed on Oct. 6, 2020, and claims benefit to Belgian Patent Application No. BE 2019/5661, filed on Oct. 9, 2019. The International Application was published in German on Apr. 15, 2021 as WO/2021/069419 under PCT Article 21(2).

FIELD

The invention relates to a printer for outputting a printed product, preferably for marking a prolate object. Furthermore, the invention relates to a system for providing a marking which is arranged or arrangeable in a closed manner around a prolate object.

BACKGROUND

In continuous operation, a label is first printed and then dispensed. It is problematic if the label is shorter than the distance between a print line in the printer and a dispensing edge at the label dispensing point. In continuous operation, the next but one label is then already printed while the other is still being dispensed. However, when the print job is finished, the label after the next one may not be printed and it remains empty. Depending on the label size, this may also be true for a plurality of labels.

Especially if the printer does not have a retract function, the unprinted labels must be advanced. In the process, these labels are dispensed and must be removed manually. This is a waste of the print medium.

For marking electrical conductors, for example, conventionally label printers are used which print a label which then has to be manually mounted on the conductor after printing. The document US 2003/146943 A1 describes a printer that alternately prints and cuts a label. Furthermore, label printers are known which, in addition to printing, detach self-adhesive labels from a carrier (also: "liner") so that they can either be removed manually or automatically applied to the object to be marked by an application unit.

Furthermore, special printers are known which may be used for conductor labeling. The document US 2004/0211522 A1 describes a machine that winds a pre-printed wrap-around label around a conductor taken from a spindle roll. The document US 2008/0073023 A1 discloses a monolithic machine for printing and applying wrap-around labels. However, these may only print certain labels and, if an automated application is integrated, no other printing applications are possible with such a device.

Therefore, an add-on device is a significant use case for a label printer. However, the output of empty labels described at the beginning is also problematic if the printer is equipped with an add-on device and this device is to apply the dispensed label. In this case, the device interferes with or impedes the manual removal of unusable labels.

SUMMARY

In an embodiment, the present invention provides a printer for outputting a printed product, comprising: a print head configured to print on a print medium moving in a longitudinal direction, the print medium comprising a plurality of separate or separable labels detachably arranged on a carrier along the longitudinal direction; and a material interface configured to output the print medium printed by the printer as a printed product, the material interface comprising a dispensing edge and a support, which are configured to deflect the carrier over the dispensing edge and the support downstream of the print head in the longitudinal direction, wherein the dispensing edge is arranged relative to the support in a first position to induce a detaching deflection of the carrier for detaching the respective label, and wherein the dispensing edge and the support are arranged in a second position relative to each other to induce an entraining deflection for entraining the respective label on the carrier.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
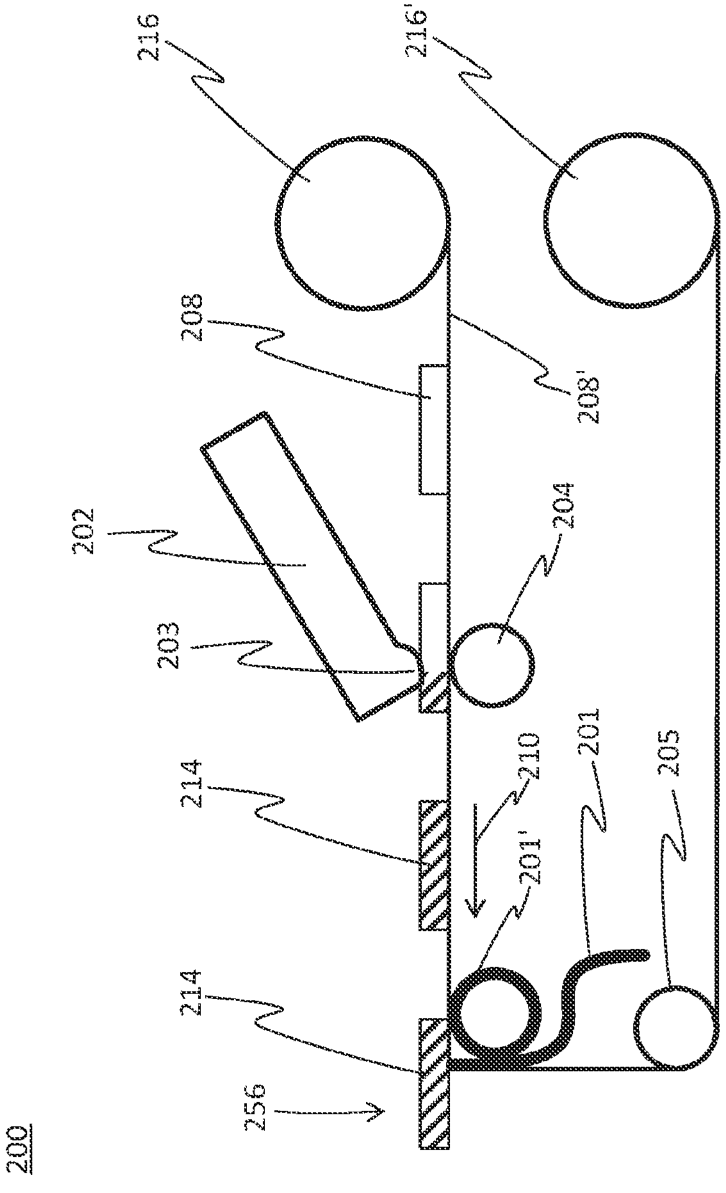
FIG. 1 a schematic sectional view of a first embodiment of a printer for outputting a printed product.

In an embodiment, the present invention provides a printer that avoids wasting labels or at least avoids disposing blank labels or unusable labels on the output side. A printer and a printing system may be provided that supports the application of a marking to a prolate object, preferably a conductor, through exchangeable devices.

A first aspect relates to a printer for outputting a printed product. The printer comprises a print head configured to print on a print medium moving in a longitudinal direction.

The print medium comprises a plurality of separate or separable labels detachably arranged on a carrier along the longitudinal direction. Alternatively or additionally, the printer comprises a material interface for outputting the print medium printed by the printer as a printed product. The material interface comprises a dispensing edge and a support over which the carrier can be deflected in the longitudinal direction behind the print head. The dispensing edge is arranged in a first position relative to the support to induce a deflection of the carrier to detach the respective label. The dispensing edge and the support are arranged in a second position relative to each other to induce a deflection entraining the respective label on the carrier.

Embodiments of the printer allow the dispensing function to be switched on and off according to the first and second positions, respectively. As a result, an operator does not have to manually remove blank or unusable labels; preferably, these are simply rewound or wound up along with the carrier. This is particularly important for printers that may not retract the printing material. Furthermore, this is important for the use of a device arranged at the material interface for further processing of the label, so that the device is not supplied with empty or unusable labels.

Embodiments may implement a selective outputting (also: dispensing) of the label (for example, by a sharp deflection at the dispensing edge), depending on the first or second position. The detaching deflection may be achieved when the inherent stiffness of the respective label is greater than an adhesive force of the label on the carrier (i.e., liner), such that the label detaches from the carrier.

The dispensing edge may be a sheet metal edge.

In the case of the deflection that detaches (i.e., detaching deflection), the dispensing edge for the deflection may engage with the carrier. The detaching deflection may correspond to a sharp-edged deflection at the dispensing edge. In the entraining deflection, the dispensing edge may be out of contact with the carrier, for example not inducing a deflection or inducing a deflection corresponding to an entraining deflection.

A deflection angle of the dispensing edge and the support may be equal or substantially equal in the first position and the second position. In the first position, the deflection angle may be completely or substantially completely induced by the dispensing edge. In the second position, the deflection angle may be completely or substantially completely induced by the support. Alternatively or additionally, the deflection angle may be induced equally or substantially equally by the dispensing edge and the support, respectively.

The detachable labels may detach upon deflection (i.e., detaching deflection) if the deflection comprises a kink angle greater than a minimum detachment angle and/or if the deflection comprises a radius of curvature less than a maximum detachment radius. The detaching deflection may induce a kink angle in the carrier that is greater than the minimum angle and/or induce a radius of curvature that is less than the maximum radius.

The kink angle may be the angular deviation with respect to the longitudinal direction. The minimum angle may be equal to or greater than 45°, 60°, 90° or 120°. The maximum radius may be equal to or less than a thickness of the label and/or carrier.

The detaching deflection at the dispensing edge may individually detach the label passing the dispensing edge.

The dispensing edge and/or the support may be movable between the first position and the second position, preferably longitudinally movable (also: translational) and/or rotationally movable (also: rotational).

The dispensing edge and/or support may be manually movable between the first position and the second position.

In the first position, the dispensing edge may abut the carrier for detaching deflection of the carrier. Alternatively or additionally, in the second position the dispensing edge may be spaced from the carrier.

A kink angle of the detaching deflection in the first position may be greater than a kink angle induced by the dispensing edge in the second position and/or than a kink angle induced by the support in the second position.

A radius of curvature of a surface of the support for deflection of the carrier may be larger or several times larger than a radius of curvature of a surface of the dispensing edge for deflection of the carrier.

In the second position, the carrier may be deflected over a rounded surface of the support and the dispensing edge may be arranged on a side of the support facing away from the carrier. In the first position, the dispensing edge may extend transversely, preferably perpendicularly, to the longitudinal direction beyond the rounded surface.

The support may comprise at least a portion of a circumferential surface of a circular cylinder. The dispensing edge may be rotatable about an axis (for example, the axis of symmetry) of the circular cylinder between the first position and the second position. Preferably, the dispensing edge may be arranged tangentially to the circular cylinder.

In the first position, the carrier may be deflected over the dispensing edge in a deflection direction transverse to the longitudinal direction and the support may be aligned with or spaced from the dispensing edge in the longitudinal direction. In the second position, the dispensing edge may be longitudinally movable relative to the first position and/or relative to the support in the deflection direction. Preferably, in the first position and/or in the second position, the dispensing edge may be arranged behind the support with respect to the longitudinal direction.

In the first position, the carrier may be deflected over the dispensing edge in a deflection direction transverse to the longitudinal direction and the support may be aligned with or spaced from the dispensing edge in the longitudinal direction. In the second position, the dispensing edge may be longitudinally moved relative to the first position and/or relative to the support to a side of the support remote from the carrier. Preferably, in the first position, the dispensing edge may be arranged longitudinally behind the support. Alternatively or additionally, in the second position, the dispensing edge may be aligned with the support in the deflection direction or arranged forward of the support with respect to the longitudinal direction.

The printer may further comprise a dispensing edge actuator configured to move the dispensing edge and/or the support between the first position and the second position.

The printer may further comprise a control unit or regulating unit configured to control or regulate the print head and/or the dispensing edge actuator such that the dispensing edge actuator moves the dispensing edge and/or the support to the first position when a label printed and/or defect-free (preferably moved in the longitudinal direction) by the print head reaches the material interface. Alternatively or additionally, the control unit or regulating unit of the printer may be configured to control or regulate the print head and/or the dispensing edge actuator such that the dispensing edge actuator moves the dispensing edge and/or the support into the second position when a label that is unprinted and/or defective (preferably moved in the longitudinal direction) by the print head reaches the material interface.

The printer may further comprise a sensor arranged between the print head and the material interface and in signal connection with the control unit or the regulating unit, which is configured to detect an identifier printed by the print head on the respective label. The control unit or the regulating unit may further be configured to detect whether the respective label is defect-free or defective on the basis of the detected identifier.

The label may be defective if it is printed incorrectly. The sensor may detect the identifier optically, preferably without contact. The sensor may comprise a camera or a line scanner.

Alternatively or additionally, the labels may each comprise a transponder. The printer may further comprise a reading unit of the transponder, which is in signal connection with the control unit or the regulating unit and is configured to read an identification of the respective label from the associated transponder. The control unit or regulating unit may further be configured to determine whether the respective label is error-free or defective on the basis of the read-out identifier.

The label may be faulty if the identifier cannot be read and/or does not match the printed identifier. The reader unit may be configured to read the transponder's identifier using alternating magnetic fields or (preferably high-frequency) radio waves, for example as radio frequency identification (RFID) or near field communication (NFC). The alternating fields or radio waves generated by the reader unit may supply the transponder with energy at least during the reading of the identifier.

The transponder may be materially connected to the printed product, for example embedded in a surface of the print medium.

The printer may further comprise a print roller. The print head and the print roller may be configured to print on the print medium loaded in the printer. For example, the print medium, and optionally a printing material, is guided between the print roller and the print head in the longitudinal direction.

Preferably, the printer is a printer for outputting a printed product to a device for circumferentially arranging a marking closed around a prolate object, preferably around a conductor, or for providing a marking arrangeable closed around a prolate object, preferably around a conductor.

The printer may further comprise a mechanical interface configured to releasably or irreversibly mount a device to the printer. For example, the device may be configured to arrange or provide for arranging a marking on a prolate object in a circumferentially closed manner using the printed product output from the printer.

The printer may further comprise a data interface configured to communicate with the device for arranging or providing the marking, for example. Optionally, the control unit or regulating unit may be further configured to detect control signals of at least one sensor of the device communicated via the data interface that imply or indicate at least one measurand of the object to be marked, or detect the at least one measurand of the object to be marked communicated via the data interface. The print head and/or a print roller may be controlled or regulated by the control unit or regulating unit to print the print medium and output it as a printed product at the material interface in accordance with the communication via the data interface.

The at least one measurand may comprise a presence, a position, and/or a size of the object.

The data interface may be configured for wireless communication, preferably using radio signals, infrared signals, or near-field communication.

The data interface may be configured to control, regulate, synchronize, or coordinate alternate and/or event-driven operation of the device and the printer to provide or arrange the marking.

The control unit or regulating unit of the printer may be configured to control or regulate the dispensing edge actuator, the print head, the print roller and/or a feed actuator depending on measured values of the device received via the data interface, confirmation messages of the device received via the data interface and/or control commands of the device received via the data interface for printing, for feed, for retraction, for dispensing the printed product, for detaching the respective label and/or for carrying along (or entraining) the respective label.

The feed actuator may be configured to feed or retract the carrier, print medium and/or printed product.

The measured variable may be a diameter or circumference of the object. A feed or retraction of the printed product may depend on the measured variable. Alternatively or additionally, the control commands may comprise a control command to feed or retract the printed product.

The object may comprise a conductor, preferably an electrical conductor or a light guide.

A second aspect relates to a system (also: printing system) for providing a marking arranged or arrangeable in a closed loop around a prolate object, preferably around a conductor. The system comprises a printer, preferably a thermal transfer printer, configured to output a printed product at a material interface according to the printer aspect (i.e. the first aspect), Further, the system comprises a device for providing the marking arranged or arrangeable closed around the prolate object by means of the printed product, the device being configured relative to the material interface to receive the printed product output by the printer.

Optionally, the device may comprise: a material interface configured to receive the printed product output by the printer; a printing signal interface configured to detect a control signal for outputting the printed product; at least one sensor configured to detect a control signal for providing the marking; and/or at least one actuator configured to arrange the marking on the object in a circumferentially closed manner or to provide the marking for circumferentially closed arrangement, depending on the control signal for outputting the printed product and the control signal for providing the marking by means of the printed product output by the printer.

The device may be a device for circumferentially arranging a printed marking around a prolate object, preferably around a conductor.

The device may be configured as an applicator, stem or attachment of the printer, in particular of a thermal transfer printer. The device may be interchangeable. A plurality of different embodiments of the devices may optionally each be attachable to the same printer.

The printer may receive an identifier via an interface (e.g. a network interface or a serial interface).

The printer may be configured to print the received identifier onto a print medium using a printing material. The print medium (i.e. a substrate or printing material) may be paper or a plastic film, for example for heat sealing or welding.

The print medium may be portioned or cut to size. For example, the print medium may comprise labels. The labels may be arranged on a carrier (also: liner). Preferably, the labels may comprise an adhesive layer on a side applied to the printing surface. The adhesive layer may connect the label to the liner. The labels may be self-adhesive labels or adhesive labels.

The printed product may comprise the print medium printed using the printing material. The printing material may comprise a color ribbon, for example for thermal transfer printing.

The providing may comprise arranging the marking on the prolate object, preferably arranging the marking circumferentially about a longitudinal axis of the prolate object. The at least one actuator may be configured to circumferentially arrange the printed marking about a longitudinal axis of the object.

For example, the actuator may arrange or provide the marking when the control signal of the printing signal interface indicates the output of the printed product at the material interface and the control signal of the sensor indicates the presence of the object or a requested use to provide the marking.

The device and the printer may be arranged next to each other or side by side, for example without a direct mechanical connection. For example, the printer and device may each be arranged in a stationary and/or non-slip manner on the same work surface. For example, a material interface of the printer may be aligned or overlapping (or congruent) with the material interface of the device. There may be a clear gap between the printer and the device during operation.

The device may further comprise a mechanical interface configured to releasably or irreversibly attach (or mounted or fasten) the device to the printer.

The attachment (or mounting or fastening) may be irreversible, for example comprising a material connection (i.e., may be materially bonded). Alternatively, the device may be removably attached to the printer, for example, may be non-destructively detachable, and/or attachable and/or detachable without tools.

The at least one sensor of the control signal for providing the marking may be configured to sense (e.g., acquire) or detect the object, preferably to detect a presence, a location, and/or a size of the object.

The control signal for providing the marking may indicate the presence (i.e., the presence), the location, and/or the size of the object. The location may comprise a position and/or orientation of the object (for example, a longitudinal axis of the object). The size may comprise a length (for example, along the longitudinal axis), a width, a diameter, and/or a circumference of the object.

The at least one sensor of the control signal for providing the marking may acquire the object without contact.

The at least one sensor of the control signal for providing the marking may comprise a push button. The control signal for providing the marking (also: control signal for the provision of the marking or marking provision control signal) may indicate an actuation of the button (also: provision request).

The control signal for providing the marking may indicate a user request for providing the marking. The control signal for providing the marking may be a trigger signal. The actuator may be configured to arrange the marking on the object in a circumferentially closed (e.g., loop) manner or to provide the marking for circumferentially closed arrangement in response to the detection of the object and/or the acquiring of the trigger signal.

The button may be a foot switch or a hand switch.

The printing signal interface may comprise a sensor configured to sense (e.g., detect or acquire) the output of the printed product output by the printer, preferably to sense (e.g., detect or acquire) a presence, a position, and/or a feed of the output printed product.

The sensor for detecting the output of the printed product (also: sensor for detecting the output of the printed product, or in short: sensor for detecting the printed product) may be arranged at the material interface. The sensor for detecting the printed product may detect the printed product without contact (i.e., contactless).

The at least one sensor may further comprise a sensor for detecting the printed product output from the printer. Detecting the printed product may include sensing the presence, a location (e.g., position and/or orientation), and/or a size (e.g., length and/or diameter) of the printed product.

Alternatively or additionally, the printing signal interface may comprise a data interface configured to communicate, preferably bidirectionally, with the printer for providing or arranging the marking.

The at least one actuator may be configured to (for example, in response to detecting the object and/or acquiring the trigger signal) process, in communication with the printer, the printed product output by the printer for marking and to arrange, or provide for arrangement of, the marking on the object.

The bidirectional communication may comprise receiving the control signal for outputting the printed product from the printer and sending a control signal for requesting output of the printed product to the printer. For example, the control signal for providing the marking may be forwarded to the printer via the data interface as a request for output of the printed product.

The printer may be configured to deliver the printed product to the device at the material interface, for example, in accordance with the bidirectional communication and/or in response to the control signal to provide the marking.

The data interface may be configured for wireless communication, preferably using radio signals, infrared signals, and/or near-field communication.

The data interface may be configured to synchronize or coordinate an alternating and/or event-driven operation of the at least one actuator and the printer to provide or arrange the marking.

For example, a feed (e.g., feed forward) of the printed product performed by the printer may be alternately performed, synchronized, and/or coordinated with a cutting, folding, and/or wrapping of the output printed product. The respective sub-steps executed during alternating and/or event-driven operation by the device or the printer for the providing or the arranging of the marking may also be referred to as actions. The coordination of the sub-steps may also be referred to as action coordination.

The data interface may be configured to enable the printer to control the at least one actuator of the device, to read control signals from the at least one sensor and/or the printing signal interface of the device, and/or to read an identifier stored in the device.

The at least one actuator of the device may be controlled or controllable on the printer side by means of the data interface. Alternatively or additionally, measurands (or measured values) of the at least one sensor of the device may be queried (e.g., retrieved or requested) using the data interface.

The data interface may be electrically connected within the device to the at least one actuator and/or the at least one sensor.

The data interface may be configured to receive control commands for controlling or regulating the at least one actuator from the printer and/or to send control commands for controlling or regulating the printer to the printer based on the control signals from the at least one sensor and/or the printing signal interface.

The data interface may be electrically connected to the at least one actuator and/or the at least one sensor within the device via a control unit and/or a regulating unit. The control unit and/or regulating unit may determine parameters of the applicator from the acquired measured values. The control commands sent to the printer may comprise the parameters and/or control the printer according to the parameters.

The data interface may be configured to send control signals (for example, control commands and/or confirmation messages) from the at least one sensor and/or the printing signal interface, and/or parameters determined from the (aforementioned) control signals, to the printer for the providing or the arranging of the marking.

The device may further comprise a control unit or regulating unit configured to control or regulate the at least one actuator of the device depending on the control signals of the at least one sensor, measured values of the printer received via the data interface, confirmation messages of the printer received via the data interface, and/or control commands of the printer received via the data interface for arranging or providing the marking.

The control unit or the regulating unit may be further configured to obtain (e.g., receive) a control command from the printer via the data interface, to execute control or regulation of the at least one actuator in accordance with the control command, and to send a feedback to the printer via the data interface in response to completion of execution of the control command.

The feedback may comprise a confirmation of the (for example successful) completion of the execution of the control command or an error message regarding an error during the execution of the control command. For example, the feedback may inform the printer that a defined state of the device has been reached, such as an end position of the at least one actuator.

The control unit or regulating unit may further be configured to determine a parameter of the arranging based on the control signal detected or acquired by means of the at least one sensor, and to send the determined parameter to the printer via the data interface.

The detected or acquired control signal may be indicative of a diameter or circumference of the object. The determined parameter may be indicative of a length of a feed (e.g., an advance or feed forward) or a retraction of the printed product.

A control command sent from the device to the printer via the data interface may initiate the feed (e.g., advance or feed forward) or the retraction.

The control unit or regulating unit may autonomously perform the providing or arranging of the marking, or a substep of the providing or the arranging of the marking, in accordance with the control command during the time period between obtaining (e.g., receiving) the control command from the printer and sending the feedback to the printer.

The device may further comprise an electrical interface configured to supply electrical power to the device via the printer.

The data interface and/or the electrical interface may be arranged relative to the mechanical interface to contact the printer for communication or supply of electrical power when the device is attached to the printer by means of the mechanical interface.

The data interface may be arranged relative to the mechanical interface to contact the printer for communication when the device is attached to the printer by the mechanical interface. The electrical interface may be arranged relative to the mechanical interface to contact the printer for power supply when the device is attached to the printer by the mechanical interface. For example, attaching (or mounting or fastening) the device to the printer by means of the mechanical interface may cause contacts of the data interface and/or the electrical interface to become connected.

The object may comprise a conductor or may be a conductor. The conductor may be a current conductor (or electrical wire) or a light guide (or optical fiber).

The mechanical interface may comprise a centering pin or an opening for receiving a centering pin and/or a lever and an eccentric connected to the lever in a rotationally fixed manner, which eccentric is configured for attaching (or fastening) the device to the printer without screws and/or without tools.

Another aspect relates to a system (also: printing system) for providing a marking arranged or arrangeable in a closed loop around a prolate object, preferably around a conductor. The system comprises a printer, preferably a thermal transfer printer, configured to output a printed product. Further, the system comprises a device according to one embodiment of the device aspect, wherein the material interface may be arranged, relative to the printer, to receive the printed product output by the printer.

Embodiments of the device enable a modular system (also: printing system) that may be based on a single printer, for example a desktop device, so that this printer may be converted in a short time or few steps to the different applications of object marking, preferably conductor marking. For example, a user can quickly and easily form a system from a normal or application-unspecific label printer for assisting in applying a marking (for example, a label) to the prolate object to be marked, preferably the conductor to be marked.

Herein, the terms application and applying (preferably as a process step) may be interpreted to be synonymous or interchangeable. The terms arrangement and arranging (preferably as a process step) may be interpreted herein to be synonymous or interchangeable.

Applying the marking on or to the prolate object (preferably on or to the conductor) may comprise arranging the marking on or at the prolate object. Providing the marking arranged or arrangeable in a circumferentially closed manner around the prolate object (preferably around the conductor) may comprise cutting (preferably trimming) the printed product.

The prolate object may be an elongated object. At least in sections, the prolate object may be a (for example, general) cylinder, preferably a circular cylinder or a prism.

The prolate object may have a longitudinal axis. An extent of the object in the direction of the longitudinal axis may be greater (for example, several times greater) than one or any extent of the object transverse or perpendicular to the longitudinal axis.

The prolate object may be a conductor, a tube, a vessel, or a housing. The conductor may be an elongated object for conducting signals or substances. For example, the conductor may be an elongated object for conducting electrical current and/or electromagnetic radiation (preferably light). The vessel may be a test tube or a sample tube, for example for holding and/or transporting a fluid.

The conductor may comprise one core or two, at least two, three or more cores (or wires) electrically insulated or optically decoupled from each other. The cores may be parallel to each other or may be twisted together (for example, in pairs).

The core or the conductor may be a single wire or a plurality of, fine and/or superfine stranded conductors.

The conductor may be a cable, cable bundle, and/or ribbon cable. The conductor may be a light guide (also: optical fiber or light guide cable). The conductor may be a tube and/or a fluid line or conduit.

The conductor may be a cylindrical body and/or a non-rotationally symmetric elongated body. The conduction of the signals or substances may be directed along a longitudinal axis of the conductor and/or may extend between ends of the conductor.

By allowing embodiments of the device for a specific application to be attached to a printer that is not specific to the application, special printers for the respective application, and thus costs, can be avoided and/or resources can be used more effectively. For example, a utilization rate of the printer may be increased as a result. The same or further embodiments of the device may reduce a downstream manual effort in mounting the printing materials on the objects to be marked.

FIG. 1 shows a schematic sectional view of a first embodiment of a printer generally designated by reference numeral 200 for outputting a printed product 214.

The printer 200 comprises a dispensing edge 201 and a support 201'. The dispensing edge 201 and/or the support 201' is movable.

The printer comprises a print head 202 configured to print on a print medium 208 moving in a longitudinal direction 210. The print medium 208 comprises a plurality of separate or separable labels removably (i.e., detachably) arranged on a carrier 208' along the longitudinal direction 210.

The printer 200 further comprises a material interface 256 for outputting the print medium 208 printed by the printer 200 as a printed product 214. The material interface 256 comprises the dispensing edge 201 and the support 201', over which the carrier 208' is deflectable in the longitudinal direction 210 behind the print head 202.

In a first position, the dispensing edge 201 is arranged relative to the support 201' to induce a deflection of the carrier 208' that detaches the respective label. In a second position, the dispensing edge 201 and the support 201' are arranged relative to each other to induce a deflection entraining (i.e., a deflection for carrying along) the respective label on the carrier 208'.

If the label is to be dispensed, i.e. in the first position, the dispensing edge 201 is positioned so that the deflection of the carrier 208' is sharp-edged and thus the label is dispensed. If the label is not to be dispensed, the dispensing edge is brought out of contact and the deflection is no longer sharp. The label remains on the carrier 208'. The label may then be pulled back to the print position during the next print job. The dispensing edge 201 or the support 201' moves back to the first position (also: dispensing position), the label is printed and dispensed.

The movement of the dispensing edge 201 or the support 201' may be realized either translationally, rotationally or in a combined motion.

The moving dispensing edge 201 or the moving support 201' may be part of the printer or an attached or pre-mounted device (also: applicator).

For example, a device 100 detachably mounted, arranged, or arrangeable to the printer 200 may comprise the dispensing edge 201 and the support 201'; the first and second positions disclosed herein; a dispensing edge actuator; and/or a control unit or regulating unit having the features, functions, and/or process steps disclosed herein in the context of the printer 200.

Moving the dispensing edge 201 and/or the support 201' may be accomplished in a plurality of ways, such as manually by a mechanical actuation of the operator; using a dedicated motorized drive (i.e., the dispensing edge actuator); and/or using a pre-existing drive that is mechanically coupled (preferably to the drive) to the dispensing edge.

Another possible application of the movable dispensing edge 201 and/or support 201' is based on a check of the printed image and optionally of an RFID label. If the printing of the label is faulty and/or the RFID content is not correct, or if the label is to be discarded for these or other reasons, the movable dispensing edge 201 and/or support 201' in the second position may feed the label to a rewinder 216'.

Figure 2B:
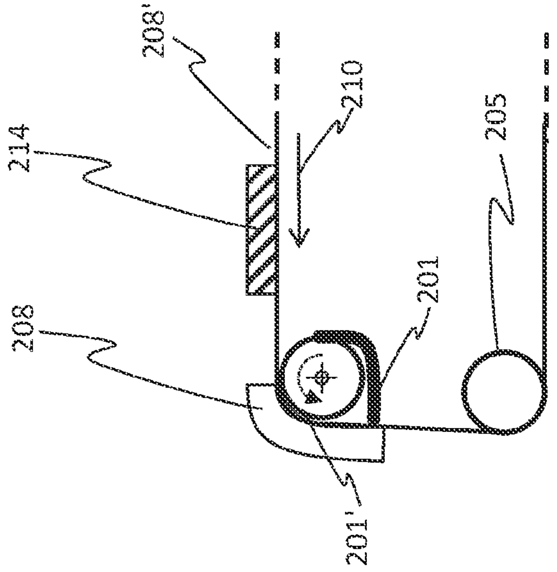
FIGS. 2A and 2B schematic sectional views of a second embodiment of the printer in a first and second position, respectively.
Figure 2A:
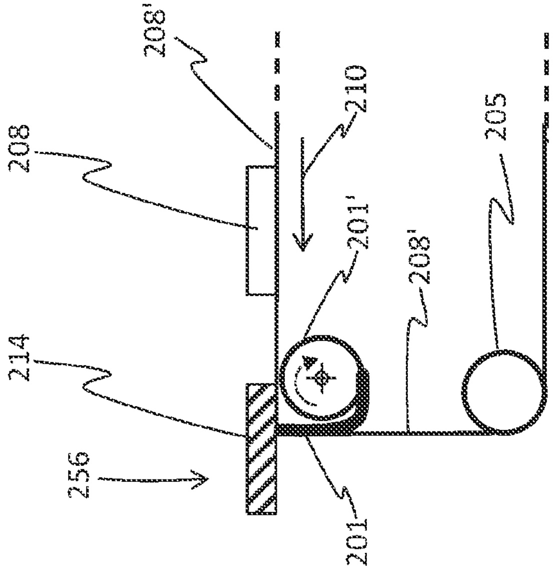

FIGS. 2A and 2B show schematic sectional views of a second embodiment of the printer 200 in the first and second positions, respectively. The features not shown in FIGS. 2A and 2B may be taken individually, partially or completely from one of the other embodiments of the printer.

The second embodiment comprises a rotational motion between the first and second positions. If the label is not to be dispensed (i.e., in the second position), the dispensing edge 201 rotates under a rounded support 201'

Figure 3B:
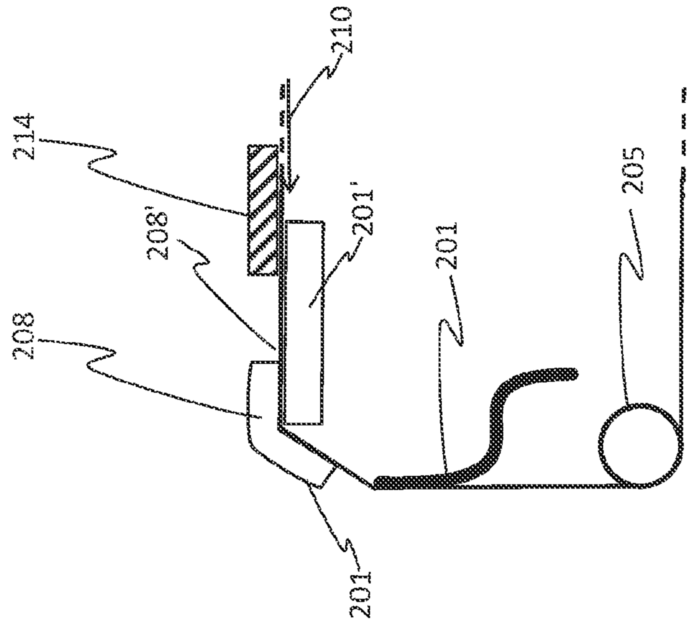
FIGS. 3A and 3B schematic sectional views of a third embodiment of the printer in a first and second position, respectively.
Figure 3A:
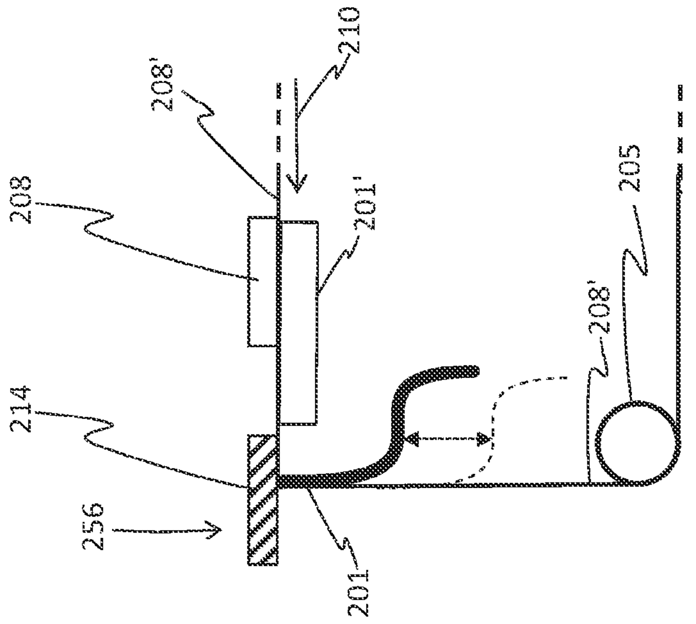

FIGS. 3A and 3B show schematic sectional views of a third embodiment of the printer 200 in the first and second positions, respectively. The features not shown in FIGS. 3A and 3B may be taken individually, partially or completely from one of the other embodiments of the printer.

The third embodiment comprises a translational motion between the first and second positions. Preferably, the transition from the first position to the second position comprises a downward motion (i.e., in the direction of gravity). The dispensing edge 201 moves downward so that instead of deflecting the label by a kink angle (for example, 90°) of the detaching deflection, the label is deflected by only a kink angle (for example, 45°) of the entraining deflection.

Figure 4B:
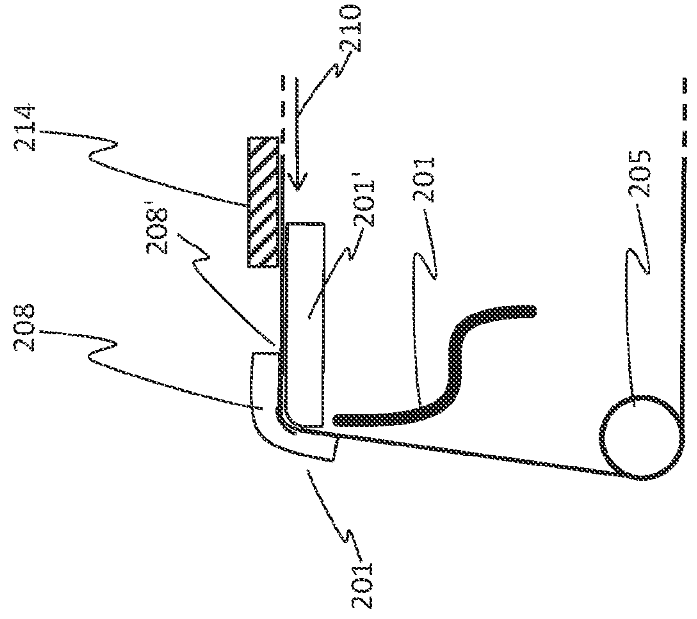
FIGS. 4A and 4B schematic sectional views of a fourth embodiment of the printer in a first and second position, respectively.
Figure 4A:
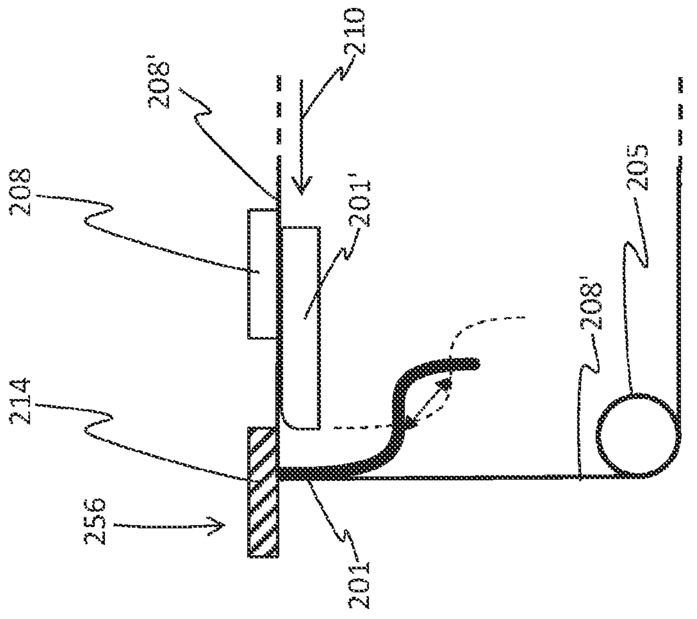

FIGS. 4A and 4B show schematic sectional views of a fourth embodiment of the printer 200 in the first and second positions, respectively. The features not shown in FIGS. 4A and 4B may be taken individually, partially or completely from one of the other embodiments of the printer.

The fourth embodiment comprises an oblique (preferably not only vertical and not only horizontal) translational motion between the first and second positions. The dispensing edge 201 moves both laterally and downwardly. The label is then guided only over a rounded support edge of the support 201'. Alternatively or additionally, the support 201' may be movable.

Figure 5:
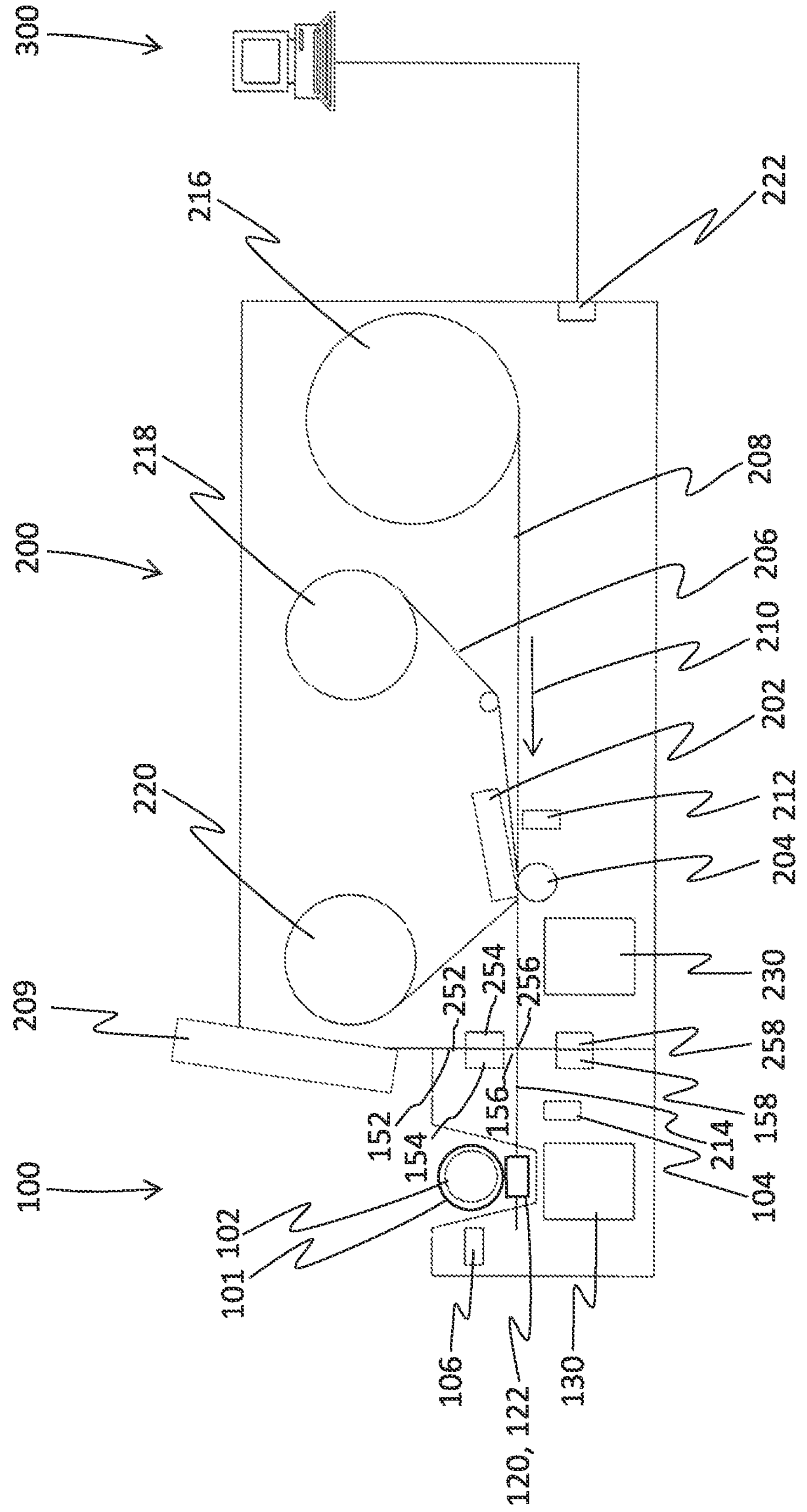
FIG. 5 a schematic sectional view of a first embodiment of a device for providing a marking mounted on an embodiment of a printer.

FIG. 5 shows an embodiment of a device generally designated by reference numeral 100 for providing (for example, for dispensing, arranging, and/or applying) a marking 101 arranged or arrangeable in a closed circumferential manner around a prolate object 102, preferably around a conductor.

The device 100 comprises a material interface 156 configured to receive a printed product 214 output from a printer 200. Further, the device 100 comprises a printing signal interface (for example, a sensor generally designated herein by reference numeral 104 and/or a data interface generally designated herein by reference numeral 158) configured to detect a control signal for outputting the printed product 214.

Further, the device 100 comprises at least one sensor 106 configured to detect a control signal for providing the marking 101.

Further, the device 100 comprises at least one actuator (for example, at least one of the actuators generally designated herein by reference numerals 120 and 122) configured to arrange the marking 101 on the object 102 in a closed circumferential manner or to provide the marking 101 for closed circumferential arrangement, depending on the control signal for outputting the printed product 214 and the control signal for providing the marking 101 using the printed product 214 output from the printer 200.

Optionally, the device 100 comprises a mechanical interface 152 configured to removably attach the device 100 to a printer 200.

For example, the printing signal interface comprises a data interface 158 configured to communicate with the printer 200 for providing the printed marking 101. The control signal for outputting the printed product 214 may be received by the printer (for example, its controller or control unit generally designated by reference numeral 230). Alternatively or additionally, the printing signal interface comprises a sensor 104 configured to detect the output of the printed product 214.

For example, the sensor 106 of the device 100 is configured to detect the object 102, preferably the conductor 102, (for example, its presence and/or size, preferably width or diameter). Alternatively or additionally, the sensor 106 comprises a button, the actuation of which initiates the provisioning.

Through the material interface 156, the device 100 receives the printed product 214 output by the printer 200. The at least one actuator (for example, at least one of the actuators generally designated herein by reference numerals 120 and 122) of the device 100 may be configured (preferably controlled) to provide (for example, apply or arrange) the marking 101 by means of (i.e., using) the printed product 214 output by the printer 200 in response to the communication with the printer 200 (for example, via the data interface 158) and/or detection of the object 102 (preferably the conductor), for example, by means of the sensor 106.

For a concise description, and without limitation of the prolate object 102, a conductor is described below as an example of the prolate object 102.

Preferably, the device 100 further comprises an electrical interface 154 for supplying power to the device 100 via the printer 200. Alternatively or additionally, the device 100 may comprise its own power supply, such as a power supply for connection to a power grid or a rechargeable electrical energy storage device (such as a secondary cell).

Optionally, the device 100 comprises a control unit 130 or regulating unit 130 configured to control or regulate the at least one or each actuator (for example, the actuator 120 and/or 122) of the device 100, for example, according to a controlled variable whose actual value is detected by the sensor 106 as measured values. Alternatively or additionally, the control unit 130 or the regulating unit 130 may be configured to acquire the measured values from the at least one sensor 104 and/or 106 and send them to the printer 200 via the data interface 158. Alternatively or additionally, the control unit 130 or the regulating unit 130 may be configured to receive control commands for controlling or regulating the at least one actuator (for example, the actuator 120 and/or 122) from the printer 200 via the data interface 158 and/or to send control commands for controlling or regulating the printer 200 to the printer 200 based on measured values of the at least one sensor 106.

The printed product 214 may be a print medium 208 printed by the printer 200. The print medium 208 may be a printable tape (preferably plastic tape or adhesive tape) or a printable film (preferably plastic film or adhesive film). The printable film may comprise a self-adhesive layer on a side opposite the printing, or may be heat-sealable to itself (preferably at an end) and/or to the conductor.

The optional first actuator 120 (also: cutting unit) may be configured to cut the printed product 214. The cutting unit may be configured to cut through the printed product 214 in a transverse direction 121 transverse, preferably perpendicular, to the longitudinal direction of the printed product 214. Alternatively or additionally, the second actuator 122 may be configured to provide the cut printed product 214, preferably to arrange it on the conductor.

The marking 101 may comprise a portion of the printed product 214, such as a portion of the printed product 214 cut by the device 100 using the at least one actuator (for example, 120 and/or 122). The marking 101 may also be referred to as a label.

The marking 101 may be a printed wrap-around label, a printed flag label, or a printed section of the tube.

The application of the marking 101 to the conductor 102 may comprise a material connection of the marking 101 to the conductor 102. For this purpose, the marking 101 may be self-adhesive or bondable by heat. For example, the marking 101 may be a flag label that is wrapped around the conductor 102 during application and connected to itself in a two-dimensional manner at both ends of the marking 101. In another example, the marking 101 may be a wraparound label that is wrapped around the conductor 102 and connected to itself over a surface (or in a two-dimensional manner) during application. Alternatively or additionally, applying the marking 101 to the conductor 102 may comprise a positive (for example, displaceable in the longitudinal direction of the conductor) connection of the marking 101 to the conductor 102. For this purpose, the marking 101 may comprise a tube (for example, a shrink tube) and/or a film (for example, a weldable thermoplastic film) that can be bonded to itself at the ends (preferably by the action of heat).

Applying the marking 101 to the conductor 102 by means of the at least one actuator 120 or 122 may comprise opening the tube and/or sliding the tube (for example the shrink tube) as the marking 101 onto the conductor 102, wrapping the marking 101 around the conductor 102, wrapping the marking 101 around the conductor 102 and closing the marking 101 as a flag label, inserting the marking 101 into a transparent grommet on the conductor 102, and/or printing a tag as the marking 101 that may be clipped around the conductor 102.

The device 100 may be configured to apply the marking 101 to the conductor 102 when the conductor 102 is already mounted (for example, when one or more ends of the conductor are contacted and/or are not free ends). For example, during application, the conductor 102 may not be rotated about a transverse axis transverse to the longitudinal direction of the conductor 102, may not be rotated about a longitudinal axis parallel to the longitudinal direction of the conductor 102, and/or may be at rest.

The marking 101 applied to the conductor 102 may be captive. Alternatively or additionally, a printed surface of the applied marking 101 may be flat or substantially free of curvature. For example, the printed surface may be arranged between two embossments. As a result, the printed surface may be easily readable and/or sufficiently large.

The marking 101 may be durable, for example in terms of printing (preferably in that the printer 200 is a thermal transfer printer), in terms of the material of the print medium 208 (for example in that the print medium is a plastic film), and/or in terms of the connection to the conductor 102 (for example in that the marking 101 is positively or materially (e.g., firmly bonded or adhesively) connected to the conductor 102).

A marking 101 may be space-saving, for example so that a plurality of conductors 102 each carrying such a marking 101 may be arranged closely together. Alternatively or additionally, the marking 101 may be displaceable (i.e., movable) and/or rotatable, for example by positively connecting the marking 101 to the conductor 102. This may allow the marking 101 to be aligned on conductors 102 (such as cables) that are in close proximity to each other.

The first embodiment of the device 100 shown in FIG. 5 is attached to an embodiment of the printer generally designated by reference numeral 200. While the embodiment of the printer 200 shown in FIG. 5 may be individually or fully implementable in any embodiment of the printer 200 disclosed herein, the optional dispensing function using the dispensing edge and support is not shown in FIG. 5 for simplicity.

The embodiment of the printer 200 comprises a print head 202, a print roller 204 a light barrier 212 for detecting the printing material 208 (i.e., the material to be printed), for example, for detecting control holes, (for example, black) control marks, a beginning and/or an end of the printing material 208. The printing material 206 is, for example, a color ribbon.

The material 208 to be printed is fed between the print head 202 and the print roller 204 along with the color ribbon 206. The light barrier 212 may detect a beginning of the print medium 208 during printing to ensure positioning of the printed image within the portion of the printed product 214 using which the marking 101 is formed.

The printer 200 comprises interfaces that are spatially associated with and/or functionally correspond to the interfaces of the device, respectively. The spatially associated and/or functionally corresponding interfaces are connected or connectable to each other in pairs.

Preferably, the printer 200 comprises a mechanical interface 252 that is connected to, or is connectable to, or in communication or exchange or configured for communication or exchange with the mechanical interface 152 of the device 100. Preferably, the spatial association implies that when the mechanical interface 152 and 252 are connected (e.g., interlocked), the other interfaces of the device 100 and the printer 200 are also mutually connected or brought into communication or exchange.

Alternatively or additionally, the printer 200 comprises a data interface 258 that is connected or connectable to, or in communication or exchange with, the data interface 158 of the device 100. Alternatively or additionally, the printer 200 comprises a material interface 256 that is connected or connectable to, or in communication or exchange with, the material interface 156 of the device 100.

For example, the material interfaces 156 and 256 are in connection, or can exchange, the printed product 214. The data interfaces 158 and 258 are in communication or connection for exchanging measurement data from the respective sensors 104, 106, and/or 212 and/or control commands from the control unit 130 of the device and/or from a control unit 230 of the printer 200.

Optionally, as shown by way of example in FIG. 5, the printer 200 comprises an interface 222 to a computer or computer network 300 (for example, a connection to the Internet). The printer 200 (for example, its controller or control unit 230) may receive print jobs via the interface 222.

The device 100 for applying the marking 101 to the conductor 102 is also referred to as an applicator.

An embodiment of the applicator 100 (for example, the aforementioned first embodiment of the applicator 100) or a printing system (for short: system) comprising an embodiment of the applicator 100 and an embodiment of the printer 200 (for example, the aforementioned embodiment of the printer) are configured to perform one or more of the following functions and method steps.

The applicator 100 and the printer 200 may perform operations (which are also referred to as actions), i.e., a set of one or plurality of process steps, alternately, in particular when applying the marking 101 to the conductor 102. In doing so, the applicator 100 and the printer 200 communicate with each other via the data interfaces 158 and 258, respectively, for example, in order to coordinate parameters and/or timing of the operations (preferably of the next operation in each case). The alternating execution of the operations is also referred to as interleaved operation of the applicator 100 and the printer 200.

In a first implementation, an overall procedure control (or sequence control) is stored (e.g., implemented or executably stored) in the printer 200, for example, in the control unit 230 (preferably by means of firmware stored in the control unit 230). The overall procedure control may comprise printing on the print medium 208 and applying the printed product 214 resulting from the printing.

A procedure control (or sequence control) of the applicator 100 may be stored (e.g., implemented or executably stored) in the applicator 100 and/or the printer 200. The procedure control of the applicator 100 may comprise (preferably exclusively) applying the marking 101 to the conductor 102 using the printed product 214. For example, the marking 101 is applied to the conductor 102 by executing the procedure control of the applicator 100.

In other words, executing the procedure control of the applicator 100 may be partially or entirely in the applicator 100 or exclusively executed in the printer 200. In any case, executing the procedure control of the applicator 100 causes the marking 101 to be applied to the conductor by means of the applicator 100.

In a first variant of the first implementation, the procedure control (e.g., sequence control) of the applicator 100 is stored in the printer 200. The applicator 100 preferably does not have any sequence control, for example, it also does not have a control unit 130. The control unit 230 of the printer (for example, the firmware of the printer 200 in the control unit 230) is configured to (preferably individually) control (or drive) the actuators (for example 120 and/or 122) or (preferably individually) query (or detect) the sensors (for example, 104 and/or 106) of the applicator 100 via the data interfaces 158 and 258.

In a second variation of the first implementation, the procedure control (e.g., sequence control) of the applicator 100 is stored (e.g., implemented or executably stored) in the applicator 100. For example, the applicator 100 comprises the control unit 130 or the regulating unit 130 in which the sequence control of the applicator 100 is stored (e.g., implemented or executably stored). Preferably, the control unit 130 or the regulating unit 130 is configured to control or regulate the applicator. For simplicity and without limitation, reference is made herein to the control unit 130, i.e., the function of a regulator (e.g., closed-loop control) is optionally comprised.

The execution of the procedure control (or sequence control) (preferably in the control unit 130) is started by the printer 200 (for example, the control unit 230, preferably by means of the printer firmware). For this purpose, the applicator 100 may receive a control command via the data interface 158 or may be energized via the electrical interface 154. As soon as an operation of the applicator 100 is required, the printer 200 (for example, the control unit 230, preferably by means of the printer firmware) sends a signal as a control command to the applicator 100 via the data interface 258 or 158.

Preferably, the printer 200 waits while the applicator 100 performs the requested operation (for example, initiated by the control command). As soon as the applicator 100 sends (e.g., reports) a signal via the data interface 158 or 258 as a control command of completion of the operation, the printer 200 continues execution of the overall procedure control.

Optionally, the signal from the applicator 100 to the printer 200 indicates a status of completion of the operation. For example, the status may indicate successful completion or an error that occurred during execution of the operation.

In a second implementation, the applicator 100, for example the control unit 130 (preferably using a firmware of the applicator 100) executes the overall procedure control (i.e., the overall operation). In other words, the overall procedure control is stored (e.g., implemented or executably stored) in the applicator 100, for example, in the control unit 130 (preferably by means of firmware stored in the control unit 130). By executing the overall procedure control, the applicator 100 controls the overall flow.

The printer 200 acts as a slave in the overall operation. For example, the printer 200 has sovereignty over the printed image, i.e., the printer 200 (preferably its control unit 230) performs the printing as an operation of the printer 200 in response to a corresponding control command from the applicator 100. Optionally, the printer 200 issues a control command (i.e., a first start command) to execute the overall procedure control, for example, because only the printer 200 knows about the content and/or the presence of a print job.

To implement the interleaved (or alternating or nested) operation, the applicator 100 and the printer 200 exchange information (for example, measurement data and/or control commands) using the data interface 158 and 258, respectively.

The exchanged information may comprise measured values (for example, electrical voltages, electrical currents, electrical frequencies), preferably measured values of the sensor 104 and/or 106, which are transferred (i.e., sent) from the applicator 100 to the printer 200. Alternatively or additionally, measured values of a sensor of the printer (for example, the light barrier 212) may be transferred (i.e., sent) from the printer 200 to the applicator 100. The applicator 100 or the printer 200 may determine (for example, calculate) sequence control parameters based on the measurands (or measured values) and/or transmit the measured values or the parameters to the computer or computer network 300 (for example, to application software) via the interface 222.

For example, the sensor 106 may sense or acquire a diameter or circumference of the conductor 102 (or the prolate object about its longitudinal axis). The control unit 130 and/or the control unit 230 may determine a length of a feed of the print medium 208 and/or a selection of the print medium 208, for example, depending on the sensed or acquired diameter or circumference.

Furthermore, when a defined threshold value is exceeded, these measured values may be transferred as a digital signal (for example, either as a state "0" or a state "1") to the data interface 158 or 258, respectively, in order to indicate to the other (printer 200 or applicator 100) that a defined state (for example, the completion of an operation) has been reached. For example, reaching an end position or a reference point of an actuator (for example, the actuator 120 and/or 122) may be indicated.

A reference move (or reference run) of an actuator of the applicator 100 (for example, the actuator 120 and/or 122) may be used to mechanically move an actuator (i.e., a drive connected to a mechanism of the applicator 100) to a determined position of the actuator (i.e., the mechanism), referred to as a reference position. A control command from the printer 200 or a process step of the operation, sequence control, and/or overall sequence control performed by the applicator 100 may comprise a motion (for example, a travel command) of the actuator, with the reference position serving as a reference point for the motions.

When the control unit 130 of the applicator 100 (for example, the applicator firmware) calculates one or more parameters of the applying (i.e., procedure control) from measured values (for example, transferred from the printer 200 or acquired from the sensor 104 and/or 106), the parameter(s) may be transferred to the control unit 230 of the printer 200 (preferably to the printer firmware thereof) in accordance with a communication protocol via the data interface 158 and 258. Furthermore, the control unit 130 of the applicator 100 (preferably its applicator firmware) may also use measurement data acquired by the printer 200 (for example, measurement data from the light barrier 212) to control the sequence control of the applicator (for example, as parameters of the applicator).

The printer 200 may be configured to print normal labels, for example, when no device 100 is attached to the mechanical interface 152 and/or the data interface 158.

The printer 200 may be a thermal transfer printer. The thermal transfer printer may provide high contrast and consistent marking 101. For example, the printer 200 may be a thermal transfer roll printer.

The embodiment of the printer 200 comprises an unroller 216 (or source roller) of the print medium 208 disposed upstream of the print head 202, an unroller 218 of the printing material 206 disposed upstream of the print head 202, and a rewinder 220 (or target roller) of the printing material 206 disposed downstream of the print head 202.

An electrical interface 254 of the printer 200 is configured to supply electrical power to the applicator 100 attached to the printer via the electrical interface 154 thereof.

Optionally, the printer comprises a display 209, preferably user interface with a touch-sensitive screen. The control unit 230 and/or regulating unit 230 of the printer 200 may be in signal communication with the display 209, for example, to display a message or to select or enable a print job.

Figure 6:
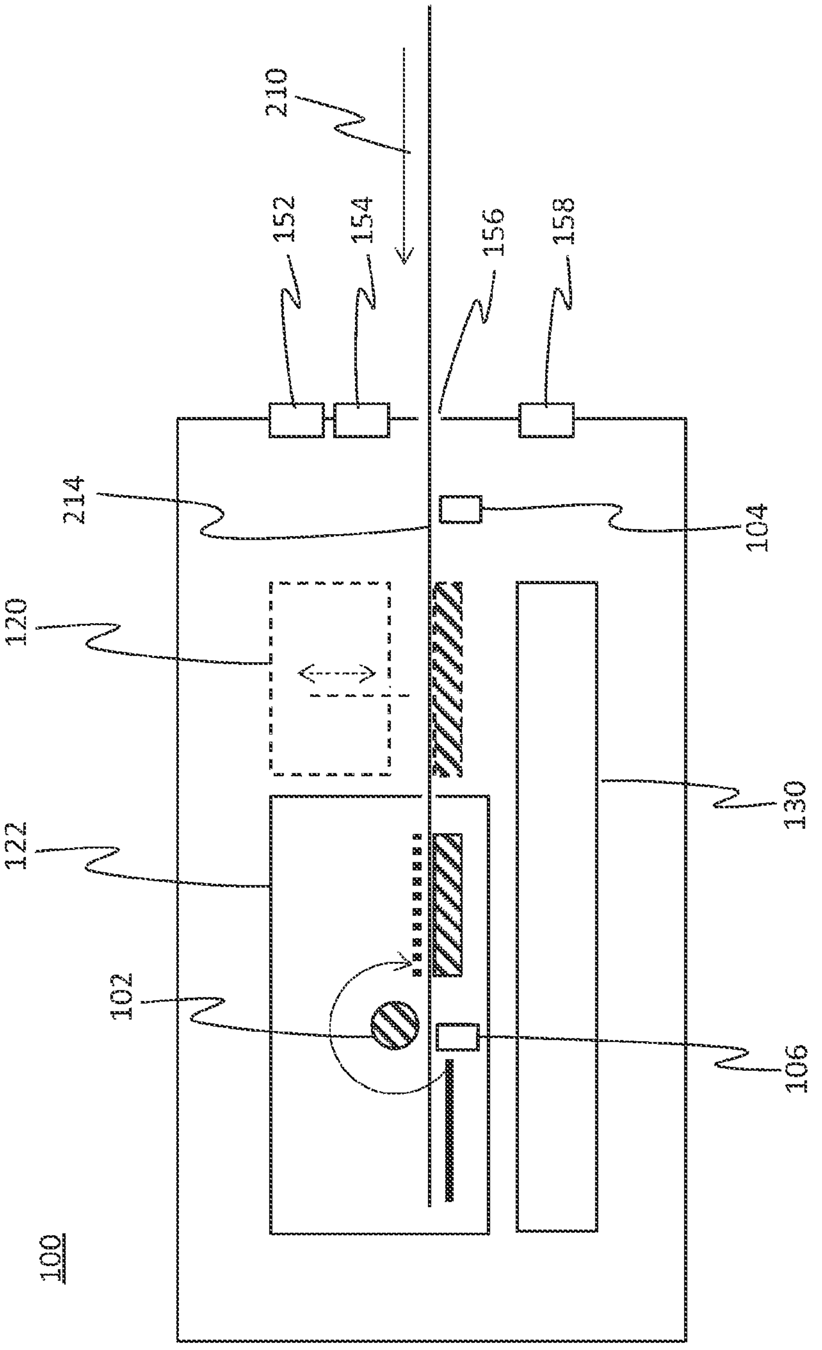
FIG. 6 a schematic sectional view of a second embodiment of the device for providing marking in a first state.
Figure 7A:
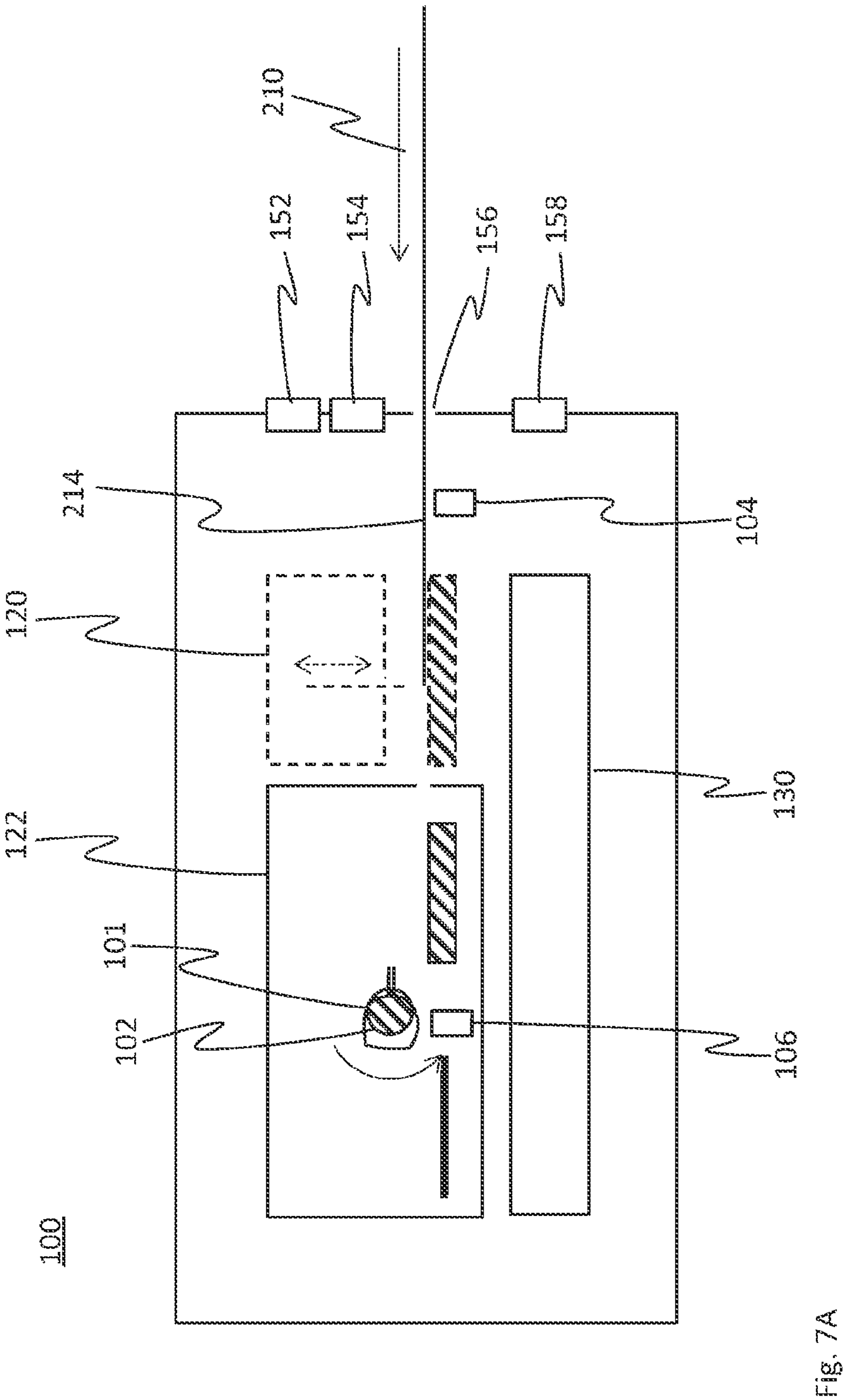
FIG. 7A a schematic sectional view of a second embodiment of the device for providing marking in a second state.

FIGS. 6 and 7A show a schematic sectional view of a second embodiment of the applicator 100 (i.e., the device 100 for applying) a printed marking in a first state and a second state of application, respectively.

The second embodiment of the applicator 100 may be implemented independently or in further variant of the first embodiment of the applicator 100. Features of the first and second embodiments of the applicator 100, denoted by the same reference numerals, may be the same or interchangeable.

The second embodiment of the applicator 100 is configured to strike or fold a printed film as a printed product 214 around the conductor 102 by means of a second actuator 122 of the applicator 100. Preferably, the sensor 106 determines the diameter of the conductor 102. The control unit 130 calculates a length from the diameter and controls the printer (more specifically, its print roller 204) via the data interface 158 to feed the printed product 214 according to the determined length.

After the feed, for example in the first state shown in FIG. 5, the printer 200 signals via the data interface 258 (i.e., to the data interface 158) that the feed has been successfully completed, for example that the determined length has been reached. In response to the message from the printer 200, the control unit 130 controls the actuator 122 to wrap or fold the printed product 214 around the conductor 102. Further, the second actuator 122 (or, in one variant, a further actuator) is configured to abut overlapping sections of the printed product 214 to one another by applying heat. Preferably, a first actuator 120 of the applicator cuts the welded sections to a flush end of the marking 101.

In a first variant of the second embodiment of the applicator 100, a portion of the surface surrounding the conductor 102 is printed and the flush cut end is short compared to the circumference of the conductor 102. Preferably, the applying, i.e., a step of the procedure control of the applicator 100, comprises two embossments performed on the printed product before and after the printed portion by means of the actuator 120, as schematically shown in FIG. 7A.

For example, the procedure control of the applicator 100 may comprise at least one of the following operations or steps. In one step, a control command is sent from the control unit 130 to the printer 200. The control command specifies the feed rate of the printed product 214 for a reference cut. In another step, in response to a notification of completion of the feed from the printer 200 to the applicator 100, the reference cut is executed by the actuator 120. A further step of the procedure control of the applicator 100 may comprise waiting until the presence of the conductor 102 is detected or acquired by means of the sensor 106. Another step of the procedure control (i.e., the procedure control sequence) of the applicator 100 may comprise acquiring the diameter of the conductor 102 by means of the sensor 106 and calculating parameters of the applying (for example, partial lengths for feeds of the printed product 214).

In a further step, a further control command is sent from the control unit 130 to the printer 200. The further control command specifies a first partial feed of the printed product 214 for a first embossing. In a further step, in response to a notification of completion of the first partial feed from the printer 200 to the applicator 100, the first embossing is performed by the actuator 120.

In a further step, a further control command is sent from the control unit 130 to the printer 200. The further control command specifies a second partial feed of the printed product 214 for a second embossing. In a further step, in response to a notification of completion of the second partial feed from the printer 200 to the applicator 100, the second embossing is performed by the actuator 120.

In a further step, a control command is sent from the control unit 130 to the printer 200 indicating a partial feed of the printed product 214 for a cutting position. In a further step, in response to a notification of completion of the partial feed for the cutting position from the printer 200 to the applicator 100, the cut is performed by the actuator 122, the printed product is wrapped or folded around the conductor 102, sealing portions of the printed product 214 brought into contact with each other in a planar manner, and a cut performed by the actuator 120.

Figure 7B:
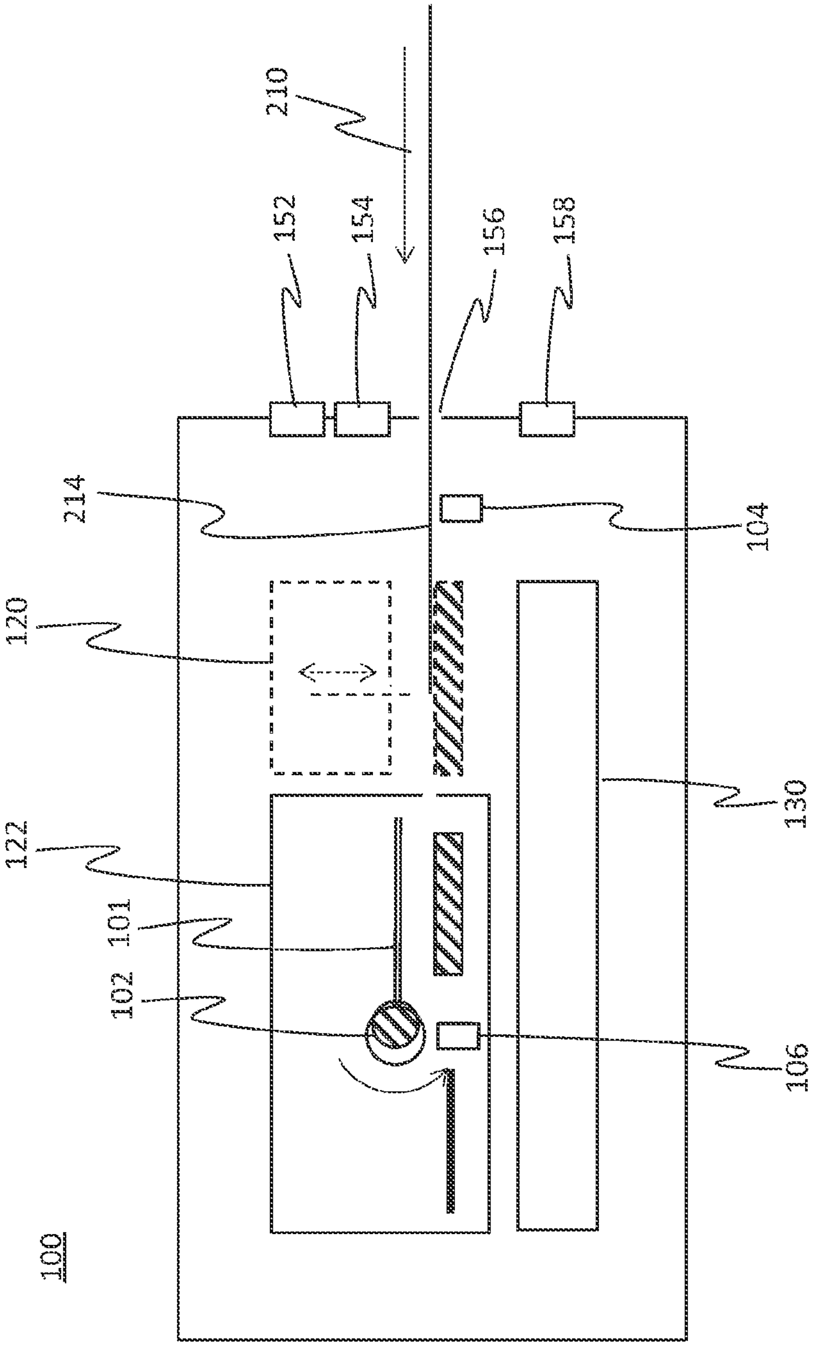
FIG. 7B a schematic sectional view of a variant of the second embodiment of the device for providing a marking in a second state.

In a second variant of the second embodiment of the applicator 100, the flush cut end is equal to or longer than the diameter of the conductor 102 and comprises the printed portion of the printed product 214, as schematically shown in FIG. 7B.

Figure 8:
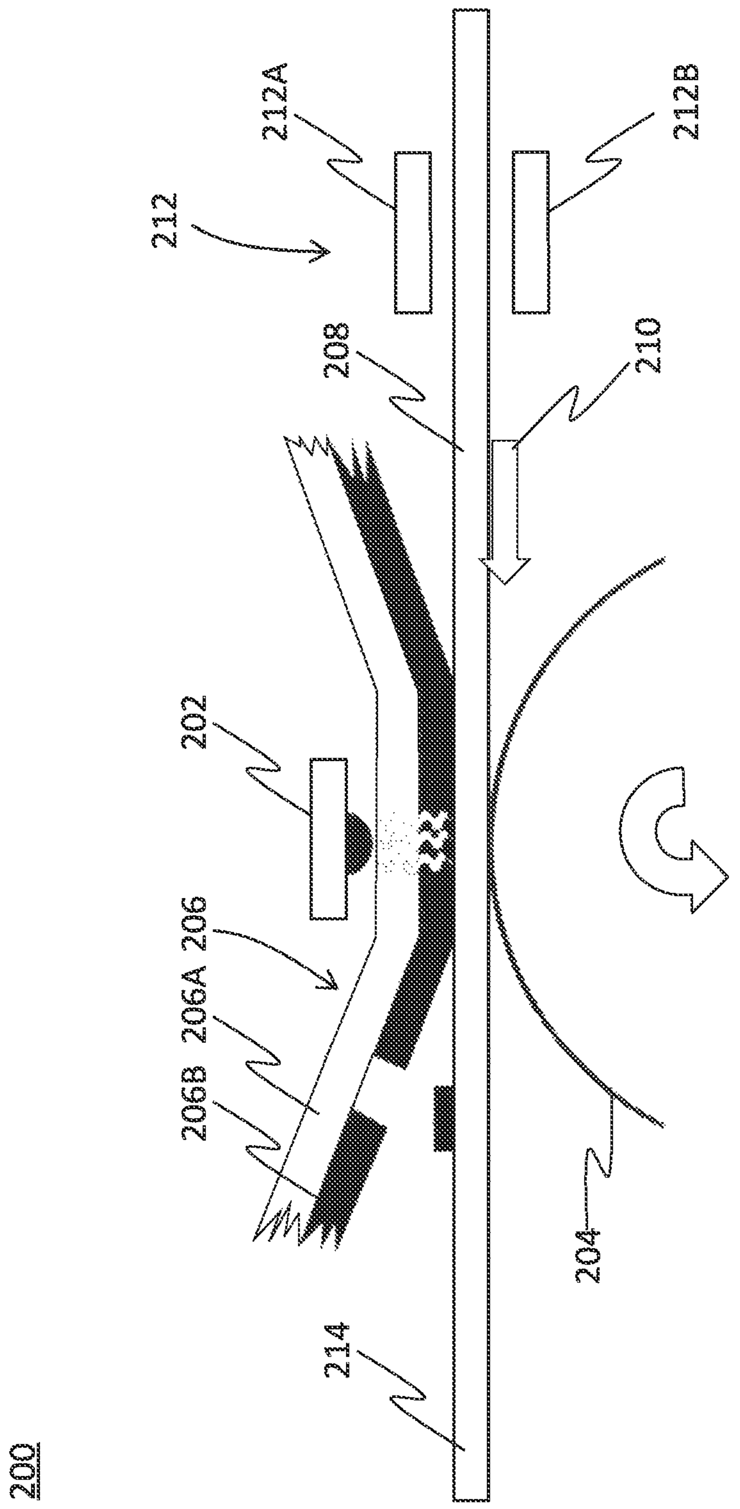
FIG. 8 a schematic sectional view of a first example of a printer as a thermal transfer printer.

FIG. 8 shows a further embodiment of the printer 200, which may be implemented independently or as a further development of the embodiment of the printer 200 described in the context of FIG. 5. Features of the embodiments designated by the same reference numerals may be identical or interchangeable. The further embodiment of the printer 200 is an example of a thermal transfer roll printer.

A control unit 230 of the printer 200 controls a feed and/or a retraction of the print medium 208 at the print head 202 and/or of the printed product 214 at the material interface 256 (and consequently at the material interface 156 of the device 100) depending on the signals of the light barrier 212 and/or control commands obtained from the device 100 via the data interface 258 (i.e., via the data interface 158 of the device 100). For this purpose, the control unit 230 may control a drive (for example, a stepper motor) for rotating the print roller 204.

The light barrier 212 may be arranged upstream of the print head 202 and/or the print roller 204 with respect to a direction of movement 210 of the print medium 208 during feed. The light barrier 212 may comprise, as exemplarily shown in FIG. 8, a light source 212A on the side of the print head 202 and a light sensor 212B on the side of the print roller 204. In a first variation, the positions of light source 212A and light sensor 212B may be interchanged. In a second variation, light source 212A and light sensor 212B may be arranged on the same side for detecting the print medium 208 in reflection.

The print head 202 comprises a plurality of heating elements. When the heating elements are heated (for example, energized) and the print roller 204 applies a predetermined (for example, sufficiently large) pressure to the print medium 208, the color pigments are transferred from the printing material 206 (for example, a color ribbon) to the material to be printed. The control unit 230 may control the stepper motor to rotate the print roller 204 and control the energization of the heating elements of the print head 202.

The printing material 206 may comprise a plurality of layers. For example, the printing material 206 may comprise a carrier material 206A (for example, a carrier film) facing away from the print medium 208 and a color layer 206B (for example, a color wax) facing toward the print medium 208.

The printer 200 is preferably a tabletop device to which the device 100 may be attached as a replaceable or interchangeable module, for example, specific to an application or for the duration of a uniform application process.

Figure 9:
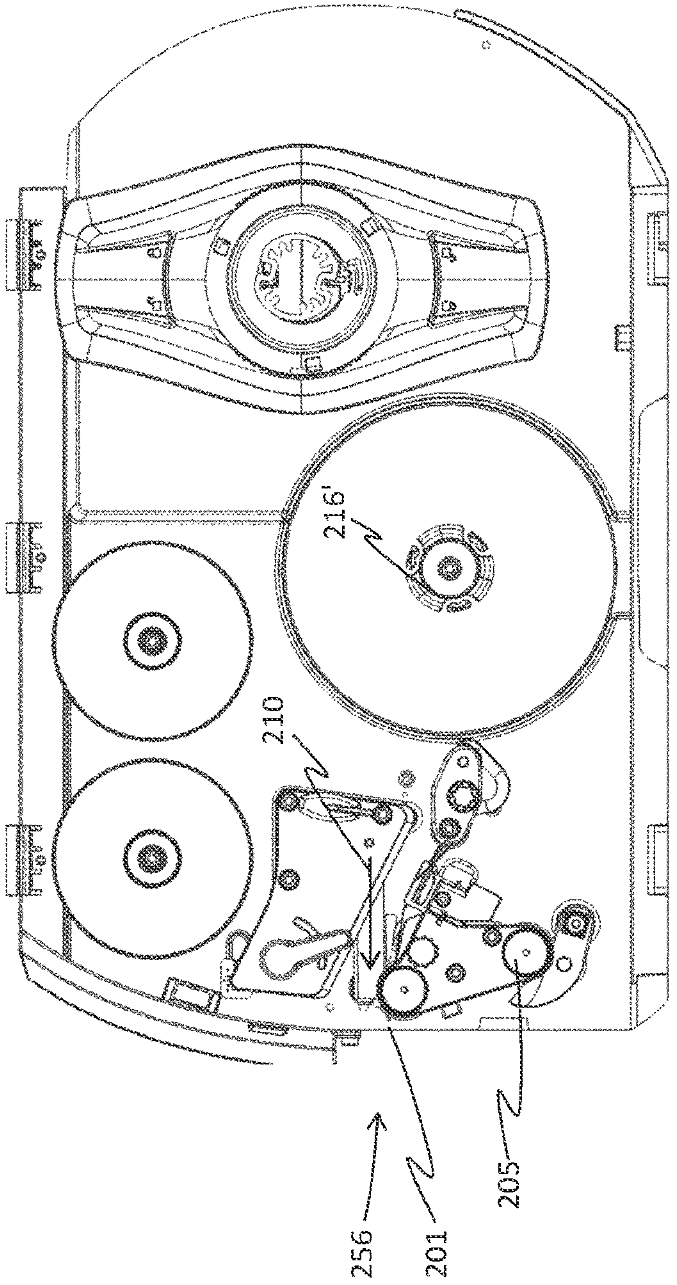
FIG. 9 a schematic sectional view of a second example of a printer as a thermal transfer printer.

FIG. 9 shows a more detailed sectional view of a printer which may be further embodied in accordance with the invention by the features described generally at the beginning and/or by the features of any of the four embodiments of FIGS. 1 to 4B.

Figure 10A:
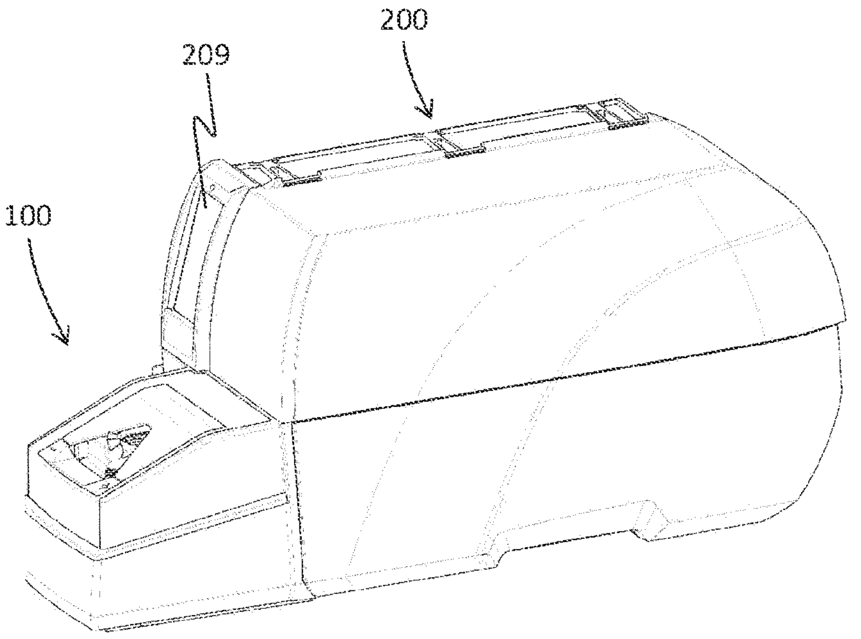
FIG. 10A a schematic perspective view of an exemplary printing system comprising an embodiment of the printer and an embodiment of the device for providing a marking, in a mounted position.
Figure 10B:
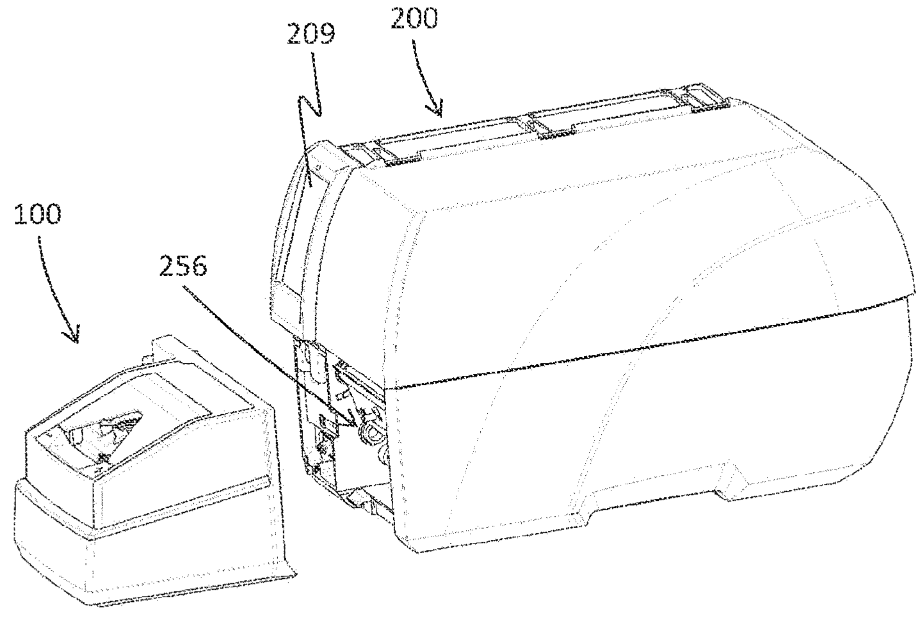
FIG. 10B a schematic perspective view of the exemplary printing system of FIG. 10A in a disassembled position.

FIG. 10A shows a schematic perspective view of an exemplary printing system (system for short), comprising an embodiment of the printer 200 and an embodiment of the device 100. In an exemplary mounted position of the device shown in FIG. 10A, all implemented physical interfaces are connected due to the arrangement of the device 100 on the printer 200. FIG. 10B shows a schematic perspective view of the exemplary printing system of FIG. 10A in a disassembled position. The physical interfaces are exposed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

| | |
|---|---|
| Device for providing a marking, for example applicator | 100 |
| Marking | 101 |
| Prolate object, preferably conductor, for example copper conductor or light guide | 102 |
| Printing signal interface for a control signal as to output of the printed product, for example sensor for acquiring the printed product | 104 |
| Sensor of a control signal to provide the marking, for example sensor for detecting the object or sensor for acquiring a provisioning request | 106 |
| First actuator of the device, for example cutting unit | 120 |
| Transverse direction | 121 |
| Second actuator of the device | 122 |
| Waisted rolls of the second actuator | 123 |
| Control unit or regulating unit of the device | 130 |
| Mechanical interface of the device | 152 |
| Electrical interface of the device | 154 |
| Material interface of the device | 156 |
| Data interface of the device | 158 |
| Printer, for example thermal transfer printer | 200 |
| Dispensing edge | 201 |
| Support | 201' |
| Print head of the printer | 202 |
| Print line of the print head | 203 |
| Print roller of the printer | 204 |
| Pulley | 205 |
| Printing material, for example color ribbon | 206 |
| Carrier material of the printing material, for example carrier foil | 206A |
| Color layer of the printing material, for example ink or color wax | 206B |
| Print medium (also: imprinting material), preferably label | 208 |
| Carrier (also: liner) of the print medium | 208' |
| Display, preferably user interface, of the printer | 209 |
| Feed direction or longitudinal direction of the print medium | 210 |
| Light barrier of the printer | 212 |
| Light source of the light barrier | 212A |
| Light sensor of the light barrier | 212B |
| Printed product of the printer | 214 |
| Unroller (also: unwinder) of the carrier and the print medium | 216 |
| Rewinder (also: take-up roller) of the carrier and, if necessary, of the print medium | 216' |
| Unroller (also: unwinder) of the printing material | 218 |

-continued

| | |
|---|---|
| Rewinder (also: take-up reel) of the printing material | 220 |
| Data interface of the printer | 222 |
| Control unit of the printer | 230 |
| Mechanical interface of the printer | 252 |
| Electrical interface of the printer | 254 |
| Material interface of the printer | 256 |
| Data interface of the printer | 258 |
| Computer or computer network | 300 |

The invention claimed is:

1. A printer for outputting a printed product, comprising:

a print head configured to print on a print medium moving in a longitudinal direction, the print medium comprising a plurality of separate or separable labels detachably arranged on a carrier along the longitudinal direction; and a material interface configured to output the print medium printed by the printer as a printed product, the material interface comprising a dispensing edge and a support, which are configured to deflect the carrier over the dispensing edge and the support downstream of the print head in the longitudinal direction, wherein the dispensing edge is arranged relative to the support in a first position to induce a detaching deflection of the carrier for detaching the respective label, and wherein the dispensing edge and the support are arranged in a second position relative to each other to induce an entraining deflection for entraining the respective label on the carrier.

2. The printer of claim 1, wherein the dispensing edge and/or the support are movable between the first position and the second position.

3. The printer of claim 1, wherein the dispensing edge and/or the support are manually movable between the first position and the second position.

4. The printer of claim 1, wherein, in the first position the dispensing edge abuts the carrier for the detaching deflection of the carrier, and/or wherein in the second position the dispensing edge is spaced from the carrier.

5. The printer of claim 1, wherein, in the second position the carrier is deflected over a rounded surface of the support and the dispensing edge is arranged on a side of the support facing away from the carrier, and wherein in the first position the dispensing edge projects beyond the rounded surface transversely to the longitudinal direction.

6. The printer of claim 1, wherein the support comprises at least a portion of a circumferential surface of a circular cylinder, and wherein the dispensing edge is rotatably movable about an axis of the circular cylinder between the first position and the second position.

7. The printer of claim 1, wherein, in the first position the carrier is deflected via the dispensing edge in a deflection direction transverse to the longitudinal direction, wherein the support is aligned in the longitudinal direction with the dispensing edge or is spaced from the carrier, and wherein, in the second position the dispensing edge is longitudinally moved relative to the first position and/or relative to the support in the deflection direction.

8. The printer of claim 1, wherein in the first position the carrier is deflected over the dispensing edge in a deflection direction transverse to the longitudinal direction and the support is aligned with the dispensing edge in the longitudinal direction or is spaced from the carrier, and wherein in the second position the dispensing edge is longitudinally moved relative to the first position and/or relative to the support to a side of the support facing away from the carrier.

9. The printer of claim 1, further comprising:
a dispensing edge actuator configured to move the dispensing edge and/or the support between the first position and the second position.

10. The printer of claim 1, further comprising:
a control unit or regulating unit configured to control or regulate the print head and/or the dispensing edge actuator so that:
the dispensing edge actuator moves the dispensing edge and/or the support to the first position when a label, which is printed by the print head and/or free of defects, moved in the longitudinal direction, reaches the material interface, and/or
the dispensing edge actuator moves the dispensing edge and/or the support into the second position when an unprinted and/or defective label moved in the longitudinal direction by the print head reaches the material interface.

11. The printer of claim 10, further comprising:
a sensor arranged between the print head and the material interface and in signal communication with the control unit or the regulating unit, the sensor being configured to acquire an identifier printed on the respective label by the print head,
wherein the control unit or the regulating unit is further configured to determine, based on the acquired identifier, whether the respective label is free of defects or defective.

12. The printer of claim 10, wherein the labels each comprise a transponder, and
wherein the printer further comprises:
a reading unit of the transponder, which is in signal communication with the control unit or the regulating unit and is configured to read an identifier of the respective label from the associated transponder,
wherein the control unit or the regulating unit is further configured to determine, based on the read identifier, whether the respective label is free of defects or defective.

13. The printer of claim 10, further comprising:
a mechanical interface configured to releasably or irreversibly attach a device to the printer.

14. The printer of claim 10, further comprising:
a data interface configured to communicate with the device for arranging or providing the marking.

15. The printer of claim 14, wherein the data interface is configured for wireless communication.

16. The printer of claim 14, wherein the data interface is configured to control, regulate, synchronize, or coordinate alternating and/or event-driven operation of the device and the printer to provide or arrange the marking.

17. The printer of claim 13, wherein the object comprises a conductor.

18. A system for providing a marking arranged or arrangeable in a circumferentially closed manner around a prolate object, comprising:
the printer of claim 1 configured to output a printed product at a material interface; and
a device configured to provide the marking arranged or arrangeable in a circumferentially closed manner around the prolate object using the printed product,
wherein the device is arranged relative to the material interface to receive the printed product output by the printer.

19. The system of claim 18, wherein the device comprises:
a material interface configured to receive the printed product output by the printer;
a print signal interface configured to acquire a control signal indicative of the output of the printed product;
at least one sensor configured to acquire a control signal indicative of the providing of the marking; and
at least one actuator configured to arrange the marking on the object in a circumferentially closed manner or to provide the marking for circumferentially closed arrangement, depending on the control signal indicative of the output of the printed product and the control signal indicative of the providing of the marking using the printed product output by the printer.

20. A printer for outputting a printed product, comprising:
a print head configured to print on a print medium moving in a longitudinal direction, the print medium comprising a plurality of separate or separable labels detachably arranged on a carrier along the longitudinal direction; and
a material interface configured to output the print medium printed by the printer as a printed product, the material interface comprising a dispensing edge and a support, which are configured to deflect the carrier over the dispensing edge and the support downstream of the print head in the longitudinal direction,
wherein the dispensing edge is arranged relative to the support in a first position to induce a detaching deflection of the carrier for detaching the respective label,
wherein the dispensing edge and the support are arranged in a second position relative to each other to induce an entraining deflection for entraining the respective label on the carrier, and
wherein a kink angle of the detaching deflection in the first position is greater than a kink angle induced by the dispensing edge in the second position and/or than a kink angle induced by the support in the second position.

21. A printer for outputting a printed product, comprising:
a print head configured to print on a print medium moving in a longitudinal direction, the print medium comprising a plurality of separate or separable labels detachably arranged on a carrier along the longitudinal direction; and
a material interface configured to output the print medium printed by the printer as a printed product, the material interface comprising a dispensing edge and a support, which are configured to deflect the carrier over the dispensing edge and the support downstream of the print head in the longitudinal direction,
wherein the dispensing edge is arranged relative to the support in a first position to induce a detaching deflection of the carrier for detaching the respective label,
wherein the dispensing edge and the support are arranged in a second position relative to each other to induce an entraining deflection for entraining the respective label on the carrier, and
wherein a radius of curvature of a surface of the support for deflecting the carrier is several times greater than a radius of curvature of a surface of the dispensing edge for deflecting the carrier.

* * * * *